(12) United States Patent
Ford (10) Patent No.: US 7,703,235 B2
(45) Date of Patent: Apr. 27, 2010

(54) HYDRODYNAMIC FISHING DEVICE

(75) Inventor: Randolph K. Ford, Stayner (CA)

(73) Assignee: Walker Downriggers, Inc., Stayner, Ontario (CA)

( * ) Notice: Subject to any disclaimer, the term of this patent is extended or adjusted under 35 U.S.C. 154(b) by 0 days.

(21) Appl. No.: 11/542,865

(22) Filed: Oct. 4, 2006

(65) Prior Publication Data

US 2008/0083153 A1    Apr. 10, 2008

(51) Int. Cl.
*A01K 91/08* (2006.01)
(52) U.S. Cl. .................... 43/43.13; 43/42.22
(58) Field of Classification Search ........... 43/43.13, 43/43.12, 42.22
See application file for complete search history.

(56) References Cited

U.S. PATENT DOCUMENTS

| | | | | |
|---|---|---|---|---|
| 1,232,211 | A | * | 7/1917 | Burkman .................... 43/42.22 |
| 1,842,591 | A | * | 1/1932 | Dunkelberger ............. 43/42.22 |
| 1,977,003 | A | * | 10/1934 | Maynard .................... 43/42.22 |
| 2,134,330 | A | * | 10/1938 | Fink ........................... 43/42.22 |
| 2,563,386 | A | * | 8/1951 | Wight, Jr. .................. 43/42.22 |
| 2,578,786 | A | * | 12/1951 | Davis ......................... 43/42.22 |
| 2,808,677 | A | * | 10/1957 | Dusablon et al. ........... 43/42.22 |
| 2,924,907 | A | * | 2/1960 | Hamilton ................... 43/43.13 |
| 3,037,317 | A | * | 6/1962 | Morrison et al. ........... 43/43.12 |
| 3,081,575 | A | * | 3/1963 | Meisner ..................... 43/43.12 |
| 3,199,242 | A | * | 8/1965 | Holmstrom ................ 43/43.12 |
| 3,269,051 | A | * | 8/1966 | Saunders, Jr. .............. 43/43.12 |
| 3,583,089 | A | * | 6/1971 | Scarbro ..................... 43/43.13 |
| 3,643,370 | A | * | 2/1972 | Cook et al. ................ 43/43.13 |
| 3,813,809 | A | * | 6/1974 | Frotiee ...................... 43/43.13 |
| 3,818,624 | A | * | 6/1974 | Duffy ........................ 43/43.13 |
| 3,844,059 | A | * | 10/1974 | Weber ....................... 43/43.13 |
| 3,898,759 | A | * | 8/1975 | Jensen ....................... 43/43.13 |
| 3,940,872 | A | * | 3/1976 | Weber ....................... 43/43.13 |
| 3,974,589 | A | * | 8/1976 | Henze et al. ............... 43/43.12 |
| 4,028,840 | A | * | 6/1977 | Wille ......................... 43/43.13 |
| D246,182 | S | * | 10/1977 | Neary ...................... D22/145 |
| 4,129,956 | A | * | 12/1978 | Neary ....................... 43/43.13 |
| 4,199,890 | A | * | 4/1980 | Austin et al. .............. 43/43.12 |
| 4,282,672 | A | * | 8/1981 | Neary ....................... 43/43.13 |
| 4,395,841 | A | * | 8/1983 | Cudnohufsky ............. 43/43.12 |
| 4,524,538 | A | * | 6/1985 | Halvorsen ................. 43/43.13 |

(Continued)

FOREIGN PATENT DOCUMENTS

DE    4338138 A1 *  5/1994

(Continued)

OTHER PUBLICATIONS

"A Complete Guide on How to Effectively Troll the Directional Dipsy Diver (revised)"; Tech Report #12; Luhr Jensen & Sons, Inc.; www.luhrjensen.com #8822-012; Bears notation "Revised 061002".

*Primary Examiner*—Darren W Ark
(74) *Attorney, Agent, or Firm*—Olson & Cepuritis, Ltd.

(57) ABSTRACT

A hydrodynamic fishing device includes a plate that changes attitude as the plate passes through a body of water. A plate positioning controller is pivotally mounted to the plate and is indexable relative to the plate by direct application of manual force so as to assume a plurality of predetermined adjustment positions. The adjustment positions establish different paths of travel of the plate as the plate passes through a body of water.

8 Claims, 5 Drawing Sheets

U.S. PATENT DOCUMENTS

| | | | | |
|---|---|---|---|---|
| 4,546,565 A | * | 10/1985 | Blevins | 43/43.13 |
| 4,567,687 A | * | 2/1986 | Even et al. | 43/43.13 |
| 4,581,842 A | * | 4/1986 | Kalberer | 43/43.13 |
| D290,867 S | * | 7/1987 | Ross | D22/126 |
| 4,696,124 A | * | 9/1987 | Wille | 43/43.12 |
| 4,858,370 A | * | 8/1989 | Ryder | 43/43.13 |
| 4,876,820 A | * | 10/1989 | Vann | 43/43.13 |
| 4,920,689 A | * | 5/1990 | Anderson | 43/43.13 |
| 4,922,648 A | * | 5/1990 | Louthan | 43/43.13 |
| 4,951,413 A | * | 8/1990 | Blevins et al. | 43/43.13 |
| 5,255,467 A | * | 10/1993 | Haskell | 43/43.13 |
| 5,276,994 A | * | 1/1994 | Thompson et al. | 43/43.13 |
| D346,008 S | * | 4/1994 | Emory | D22/145 |
| 5,339,561 A | * | 8/1994 | Weber | 43/43.13 |
| 5,443,205 A | * | 8/1995 | Robotham et al. | 229/243 |
| 5,505,368 A | * | 4/1996 | Kanter et al. | 229/122.32 |
| 5,875,583 A | * | 3/1999 | Church | 43/43.13 |
| 5,950,349 A | * | 9/1999 | Walker | 43/43.12 |
| 5,979,104 A | * | 11/1999 | Walker | 43/43.12 |
| 6,016,622 A | * | 1/2000 | Even | 43/43.13 |
| 6,658,784 B1 | * | 12/2003 | Mastropaolo | 43/43.13 |
| 6,836,997 B2 | * | 1/2005 | Cramsey | 43/42.22 |
| 6,931,784 B1 | * | 8/2005 | Sutherland | 43/42.22 |
| 7,316,095 B1 | * | 1/2008 | Petner et al. | 43/42.22 |
| 2004/0244270 A1 | * | 12/2004 | Brinker et al. | 43/43.13 |
| 2006/0213113 A1 | * | 9/2006 | Emory | 43/43.13 |
| 2006/0260181 A1 | * | 11/2006 | Enos et al. | 43/43.13 |

FOREIGN PATENT DOCUMENTS

JP  9-56312 A  *  3/1997

* cited by examiner

HYDRODYNAMIC FISHING DEVICE

FIELD OF THE INVENTION

The present invention relates to hydrodynamic fishing devices, and in particular to fishing tackle of the diver sinking type.

BACKGROUND OF THE INVENTION

In order to consistently catch fish using diver sinking tackle or other types of fishing tackle, it is necessary that the bait or lure be presented at the proper depth, since fish tend to maintain activity at a particular depth or range of depths, while avoiding activity at other depths. If the bait or lure is not presented in close proximity to the fish, is it is unlikely that the fish will respond in the desired manner. The use of simple weights has been found to be undesirable, since the weights are typically consumed when a fish strikes, and are not readily reusable. Accordingly, depth control has been sought using special types of fishing tackle such as diver sinking tackle. While a certain level of improvement has been attained, other problems have emerged, especially when several fishermen are working in the same area, as when several trolling lines are operated from the same boat.

The need has arisen for three-dimensioned positioning control, not only to control depth of presentation of the bait or lure, but also for lateral or horizontal positioning control that is needed to avoid interference between the lines of fishermen operating in close proximity to one another. Such interference can lead to tangling of the lines, resulting in downtime and possible loss of fishing equipment. In order to meet the need for greater three-dimensional control, certain improvements have been made over the years to fishing tackle of the diver sinking type. Examples of improvements to such fishing tackle are given in U.S. Pat. No. 2,924,907; No. 3,844,059; No. 3,940,872; and No. 3,643,370.

In U.S. Pat. No. 3,844,059 and No. 3,940,872, for example mechanical fasteners are used to provide operating adjustments to the fishing tackle. One or more threaded fasteners are provided. These fasteners are alternately and arbitrarily tightened and loosened with the aid of a screwdriver or other implement, to allow a weight to be shifted about the flat plate so as to provide a desired lateral repositioning of the path of travel of the fishing device. Unfortunately, tightening and loosening of the fasteners is not controlled, leading to inconsistent operation of the diver sinker device. Other difficulties are encountered, since tools are required for fastener adjustments. A fisherman may find it difficult to manipulate tools to make the needed adjustments when operating from a moving boat or when otherwise off-balance, and particularly after prolonged exposure to cold or inclement weather. Accordingly, improvements in fishing tackle are still being sought.

SUMMARY OF THE INVENTION

The present invention provides a novel and improved hydrodynamic fishing device. The device includes a plate for developing vertical pressure with changes in attitude of the plate, as the plate passes through a body of water. A plate positioning controller is pivotally mounted to the plate about an axis substantially normal to the plate. The plate positioning controller is indexable relative to the plate and is biased against the plate. However, with direct application of manual force, the plate positioning controller is moved to a plurality of predetermined adjustment positions that establish different paths of travel of the plate as the plate passes through a body of water.

The plate positioning controller may be provided with a flat face contiguous with the plate, and the plate as well as the flat face may have circular configurations. If desired, the flat face may be generally concentrically mounted to the plate. The plate positioning controller may be provided with a manually graspable weighting ridge upstanding from the flat portion, and the weighting ridge may be curved or part cylindrical in shape.

Through use of a detent arrangement, for example, indexing of the plate positioning controller with respect to the plate may provide a tactile and audible indication of a change in adjustment position. It is generally preferred that the hydrodynamic fishing device include a first connection to which a hook may be connected, and a second connection to which a trolling line may be connected. In those arrangements where the plate positioning controller has a curved weighting ridge upstanding from the flat face thereof, the weighting ridge is arranged so as to have a downstream facing concave inner face and an opposed upstream facing convex outer face adjacent the second connection.

DESCRIPTION OF THE PREFERRED EMBODIMENTS

The invention disclosed herein is, of course, susceptible of embodiment in many forms. Shown in the drawings and described herein below in detail are the preferred embodiments of the invention. It is to be understood, however, that the present disclosure is an exemplification of the principles of the invention and does not limit the invention to the illustrated embodiments.

For ease of description, hydrodynamic fishing devices embodying the present invention are described hereinbelow in their usual assembled positions as shown in the accompanying drawings and terms such as front, rear, upper, lower, top, bottom, inner, outer, horizontal, longitudinal, etc. may be used herein with reference to this usual position. However, the hydrodynamic fishing devices may be manufactured, transported, sold, or used in orientations other than that described and shown herein. As another example, the present invention is described as having a connection to a hook. As is understood by those skilled in the art, a bait, a lure, or virtually any type of fish attracting device, either artificial or natural, may be used in conjunction with one or more hooks.

Figure 1:
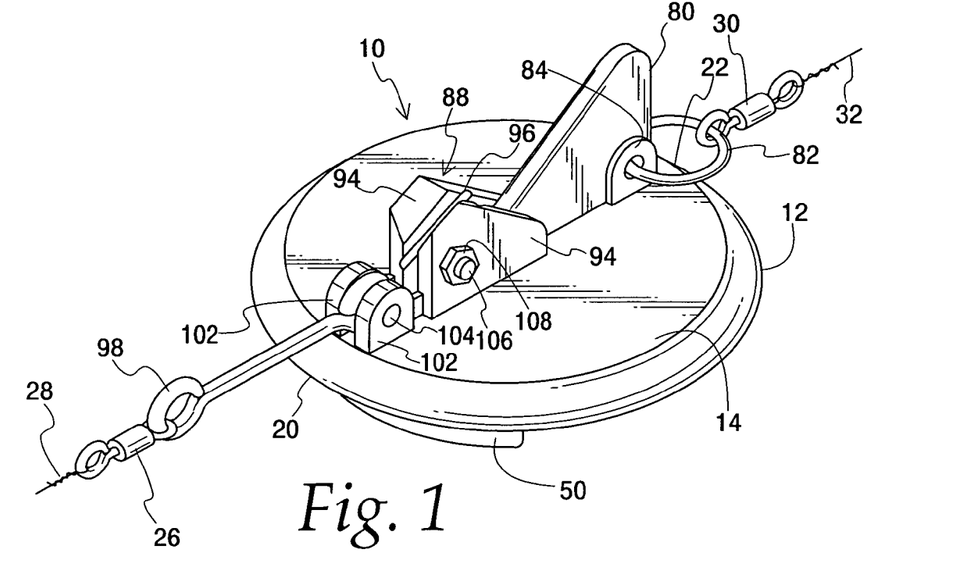
FIG. 1 is a schematic perspective view of a hydrodynamic fishing device illustrating the present invention.
Figure 2:
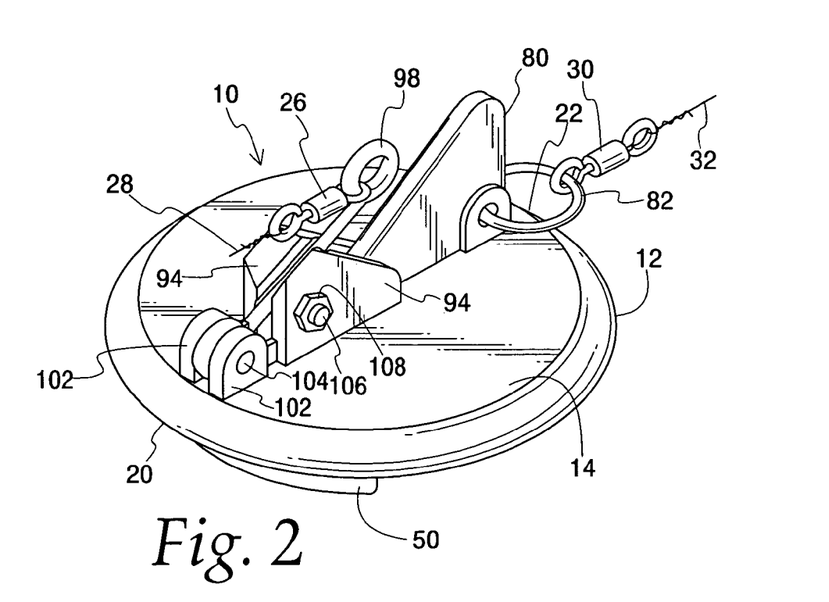
FIG. 2 is a perspective view of a hydrodynamic fishing device of FIG. 1, shown in a different operating condition.

Referring now to the drawings, and initially to FIGS. 1 and 2, a hydrodynamic fishing device is generally indicated at 10. Fishing device 10 is preferably operated as a directional diving device of the type that is pulled through the water to control the depth and position of a hook assembly, coupled to the device for use in a trolling fishing operation. As will be seen herein, an improved positioning control is provided that can be set to selectively adjust the depth and the lateral track of a hook assembly as the hydrodynamic fishing device and the hook assembly are either trolled, or pulled toward an operator of the device. Included in device 10 is a plate 12 for developing vertical pressure with changes in attitude of the plate, as the plate passes through a body of water. As can be seen, for example, in FIGS. 1, 2 and 5, plate 12 has an outer, upper surface 14 and a lower surface 16 (FIG. 5), with a forward end 20 and a rearward end 22. Included at the forward end 20 is a connection 26 (preferably of the rotating, barrel type) to which a trolling line, such as line 28 may be connected. A connection 30 (also preferably of the rotating, barrel type) is provided at the rearward end 22 for coupling to a hook assembly through a line 32. The hook assembly may comprise virtually any desirable arrangement known today. For example, a lure, or virtually any type of fish attracting device, either artificial or natural, may be used in conjunction with one or more hooks or hooked objects.

As can be seen in FIGS. 1, 4, 5, and 6, several structures are disposed above the upper surface 14 of plate 12. An upstanding fin 80 is located adjacent the rearward end 22 of plate 12 and receives a fastener ring 82 that joins connection 30 to plate 12. If desired, reinforcing supports 84 can be provided to strengthen connection of line 32 to the rearward end of plate 12.

According to one aspect of the present invention, the hydrodynamic fishing device is configurable in two different modes of operation, with an automatic transfer from one mode (FIG. 2) to the other mode (FIG. 1). The automatic transfer is provided by a slotted clamp 88 that releasably engages a pin 98. The slotted clamp 88 is located forward of fin 80 and slightly overlaps fin 80 to provide threaded securement for the tip of screw fastener 70 (see FIGS. 3 and 12). That is, the overlapping ends of clamp 88 and fin 80 are centered about the central axis normal to plate 14 (that coincides with the central axis normal to a circular flat, plate-like controller body portion 42 of plate positioning controller 40 shown in FIG. 3 as well as the central longitudinal axis of the screw fastener 70). The central axis is indicated by reference numeral 90 in FIG. 3.

Figure 5:
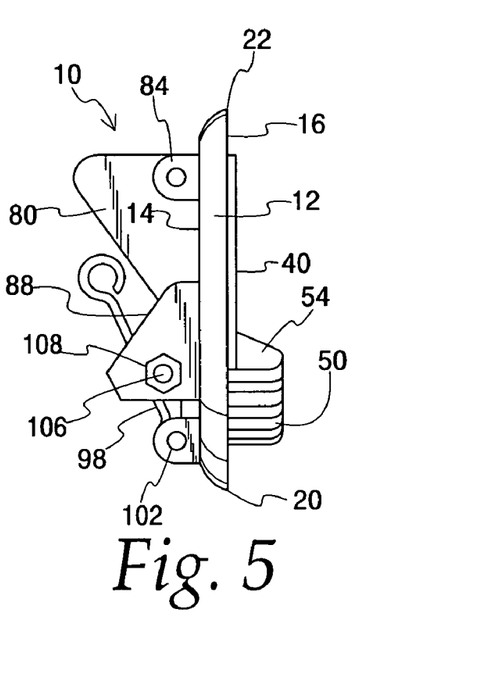
FIG. 5 is a side elevational view thereof.
Figure 6:
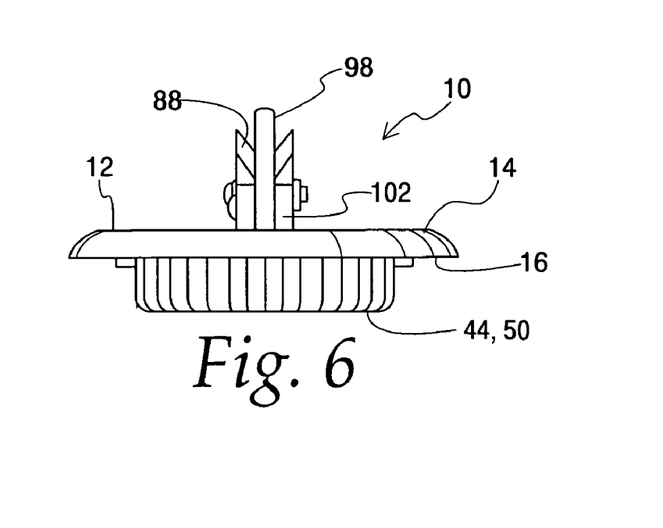
FIG. 6 is a front elevational view thereof.

Clamp 88 includes a pair of spaced apart clamp members 94 that extend above the upper surface 14 of plate 12. As can be seen for example in FIGS. 1 and 4, the opposed faces of clamp members 94 define an elongated recess 96. This recess is dimensioned so as to receive pin 98 that is pivotally connected to plate 12. The pivotal connection is provided by a pair of spaced apart support lugs 102 that receive a pivot pin 104. Pin 98 has rolled ends that form fastening eyes for securement to pin 104 and to forward connection 26. As indicated in FIGS. 2 and 5, pin 98 is received between clamping members 94 of clamp 88 so as to remain in the "set" or "trolling" position illustrated in FIG. 2. If desired, an adjustment screw 106 and nut 108 can be employed to control the clamping pressure.

As indicated in FIG. 2 the forward and rearward lines 28, 32 are located generally parallel, but vertically offset to one another. When a fish strikes the hook or when a fisherman sets the hook, tension on forward line 28 is increased, overcoming the clamping force applied to pin 98, releasing the pin from its clamped position, allowing the pin to extend forward, bringing forward line 28, and rearward line 32 into substantially coaxial alignment, as indicated in FIG. 1. With the hydrodynamic fishing device 10 in the position indicated in FIG. 2, the vertical offset between forward and rearward lines 28, 32 causes the forward end 20 of plate 12 to dip in a downward direction, thereby causing the depth of the hydrodynamic fishing device to increase as water flows over the upper surface 14 of plate 12. After a fish has been hooked, the hydrodynamic fishing device assumes the position indicated in FIG. 1, bringing the hydrodynamic fishing device to a shallower depth, as the fish is retrieved.

Figure 3:
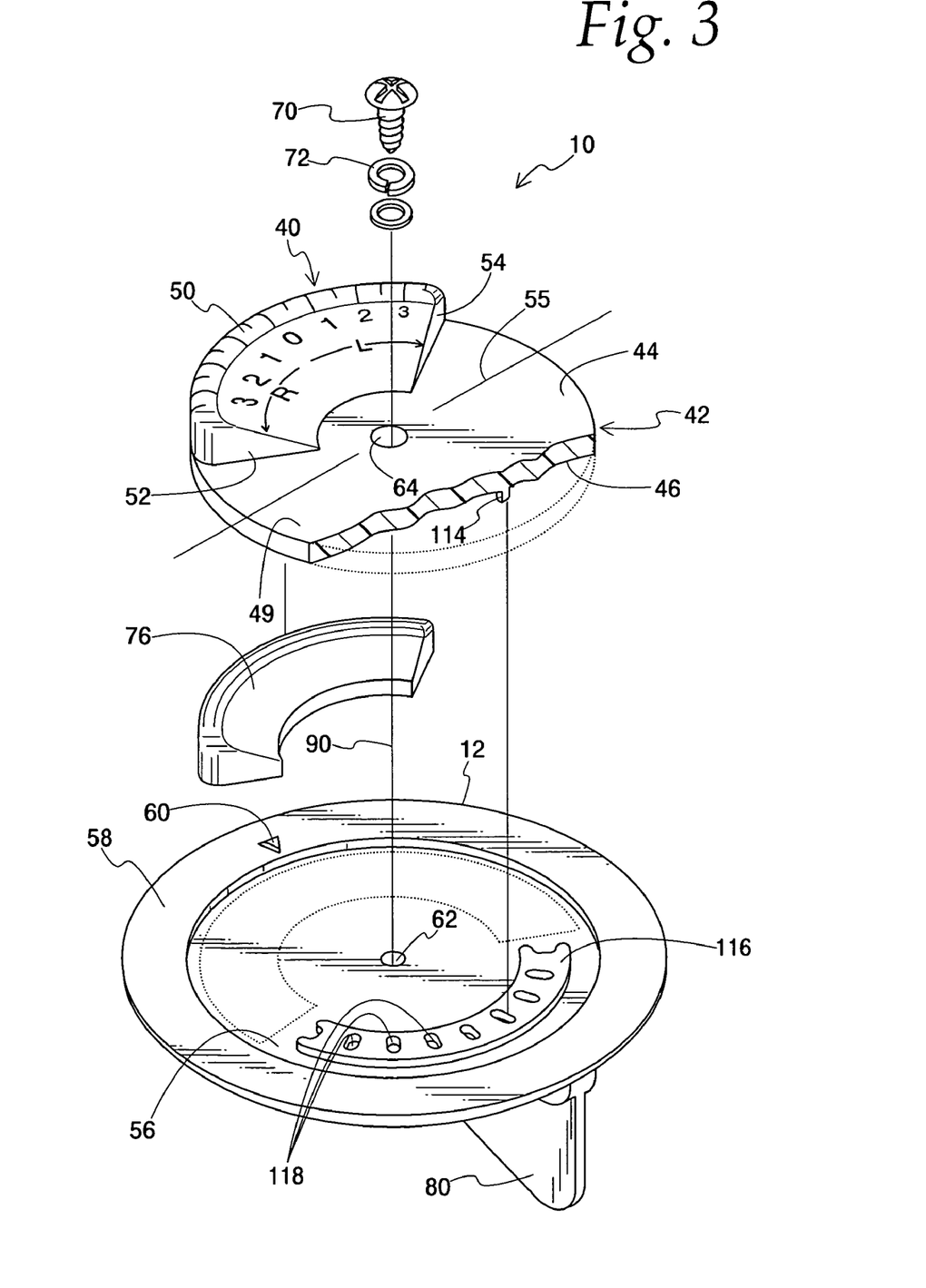
FIG. 3 is an exploded perspective view of the hydrodynamic fishing device.
Figure 4:
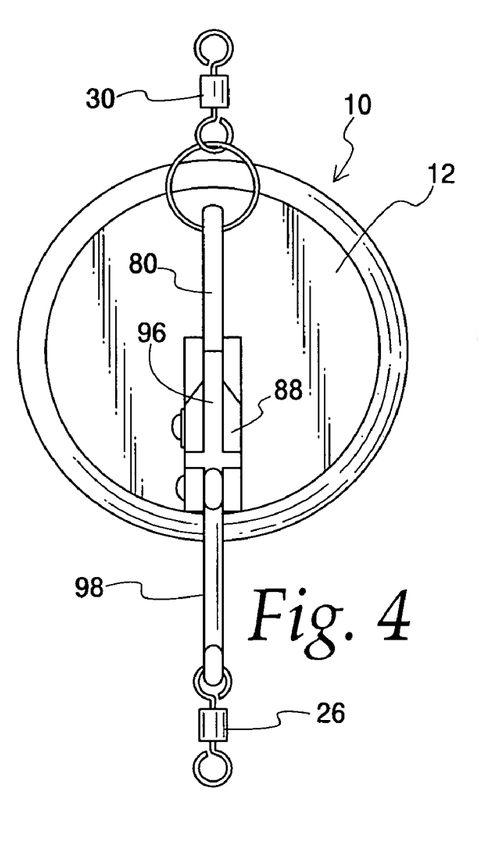
FIG. 4 is a schematic top plan view thereof.
Figure 10:
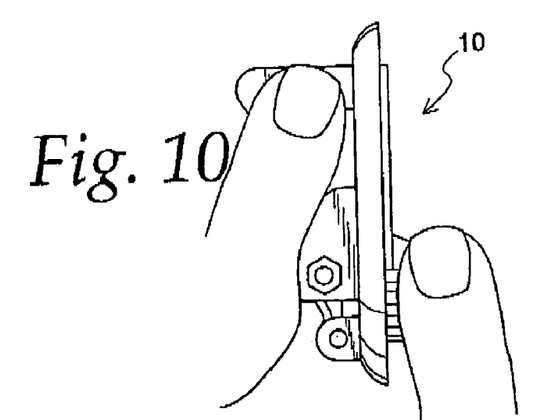
FIG. 10 is a schematic side elevational view showing hand adjustment of the hydrodynamic fishing device.
Figure 11A:
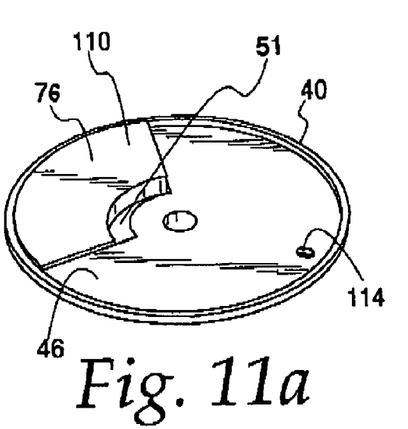
FIG. 11 is a schematic perspective view showing interior portions of the plate and the plate positioning controller.

Referring to FIG. 3, hydrodynamic fishing device 10 includes a plate positioning controller 40, having a generally circular controller body portion 42 with an outer, upper surface 44 and an opposed lower surface 46 (see also FIG. 11a). Plate positioning controller 40 further includes a manually graspable raised ridge 50, preferably integral with the controller body portion 42, that is preferably hollow, but which could also be solid, if desired. Ridge 50 is raised above the upper surface 44 of the controller body portion 42. Ridge 50 includes a scale with indicator marks (see also FIGS. 8 and 9) and indicia designating the direction and amount of position control, as will be explained herein. Ridge 50 includes end faces 52, 54 that aid in manual grasping and adjustment of the position control (see for example, FIGS. 8-10).

It has been found necessary to control the three-dimensional position of the hydrodynamic fishing device, so as to alter the three-dimensional path of travel of the hydrodynamic fishing device 10 as it is being trolled so as to pass through a body of water or when being pulled toward the fisherman. Horizontal or lateral path control has been found necessary to prevent interference between the lines of multiple hydrodynamic fishing devices being operated in close proximity to one another, as when several fisherman are engaged in the same boat or when otherwise in close proximity to one another. As will be seen herein, hydrodynamic fishing devices according to principles of the present invention provide the ability to conveniently and reliably change operating parameters of the hydrodynamic fishing device, without requiring tools or other implements.

Figure 11B:
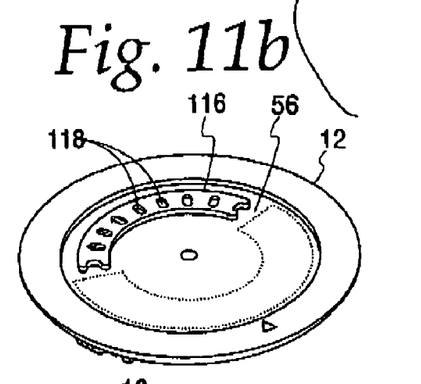
Figure 12:
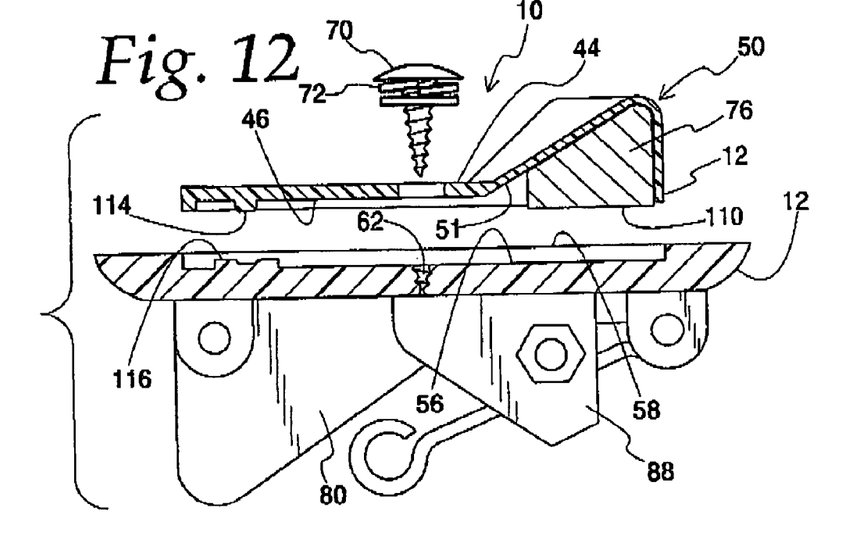
FIG. 12 is a schematic exploded side elevational view of the hydrodynamic fishing device.

Referring again to FIG. 3 and in addition to FIG. 11b, plate 12 has a recessed inner face 56 surrounded by raised rim 58, that includes an indicator such as arrow 60. As can be seen in FIG. 3, a hole 62 is formed at the center of plate 12, in alignment with a hole 64 formed in the center of plate positioning controller 40. Hole 64 is a through hole, extending through the controller body portion 42, whereas hole 62 is a blind hole, preferably threaded, that terminates in the interior of plate 12, as can be seen in FIG. 12. A screw fastener 70, shown in FIG. 3, for example, passes through plate positioning controller 40 and is received in hole 62, for threaded securement to plate 12, thus holding the plate positioning controller 40 and the plate 12 together. A bias spring 72 is provided to bias plate positioning controller 40 into contact with plate 12, as screw fastener 70 threadingly engages plate 12. The biasing force aids in the operation of a detent arrangement that provides a tactile and visual indication of the adjustment setting. As will be explained herein, the biasing force can be augmented or replaced by employing screw fastener 70 to bend somewhat the controller body portion 42 of plate positioning controller 40, about a bending axis 55 shown in FIG. 3, without causing substantial disengagement of projection 114 from raised pad 116.

Preferably, plate positioning controller 40 and plate 12 are formed of molded plastic material, although other materials, such as metals and metal alloys can be employed, if desired. It is generally preferred that ridge 50 is a hollow shell 51 that receives insert 76, preferably formed of a relatively dense material such as lead or steel. Ridge 50 provides a concentrated weight that is carried by plate positioning controller 40 as it is pivoted about the screw fastener 70 (i.e. rotated about an axis that is normal to controller body portion 42, as well as plate 12). In the preferred embodiment, the plate positioning controller 40 is formed of relatively light weight molded plastic material. Accordingly, in order to provide a concentrated weight, an insert 76 of dense material such as lead, is preferred. As will be seen herein, further advantages of an improved low friction sliding surface are provided by the insert 76 to aid in the smooth adjustment of the hydrodynamic fishing device.

As mentioned above, the insert 76 is conveniently accommodated by making ridge 50 hollow. It may be desirable, in certain instances, to form the plate positioning controller of a different material such as a metal or metal alloy. If the ridge 50 is made solid, the additional volume of material at that location may provide the desired weight concentration, eliminating the need for a separate insert 76. It is, however, preferred that an improved sliding contact be provided with the addition of a strip of low friction material, for example, and that the lower face of the plate positioning controller 40 in the region of ridge 50 be raised so as to extend beyond the inner face 46 in the manner indicated, for example, in FIGS. 11 a and 12.

As noted above, both the controller body portion 42 of plate positioning controller 40 and plate 12 have a generally cylindrical configuration, and are concentrically aligned with one another by screw fastener 70. In addition, concentric alignment is enhanced by raised rim 58 of plate 12, that is dimensioned to surround the outer edge of controller body portion 42.

Figures 7, 8, 9:
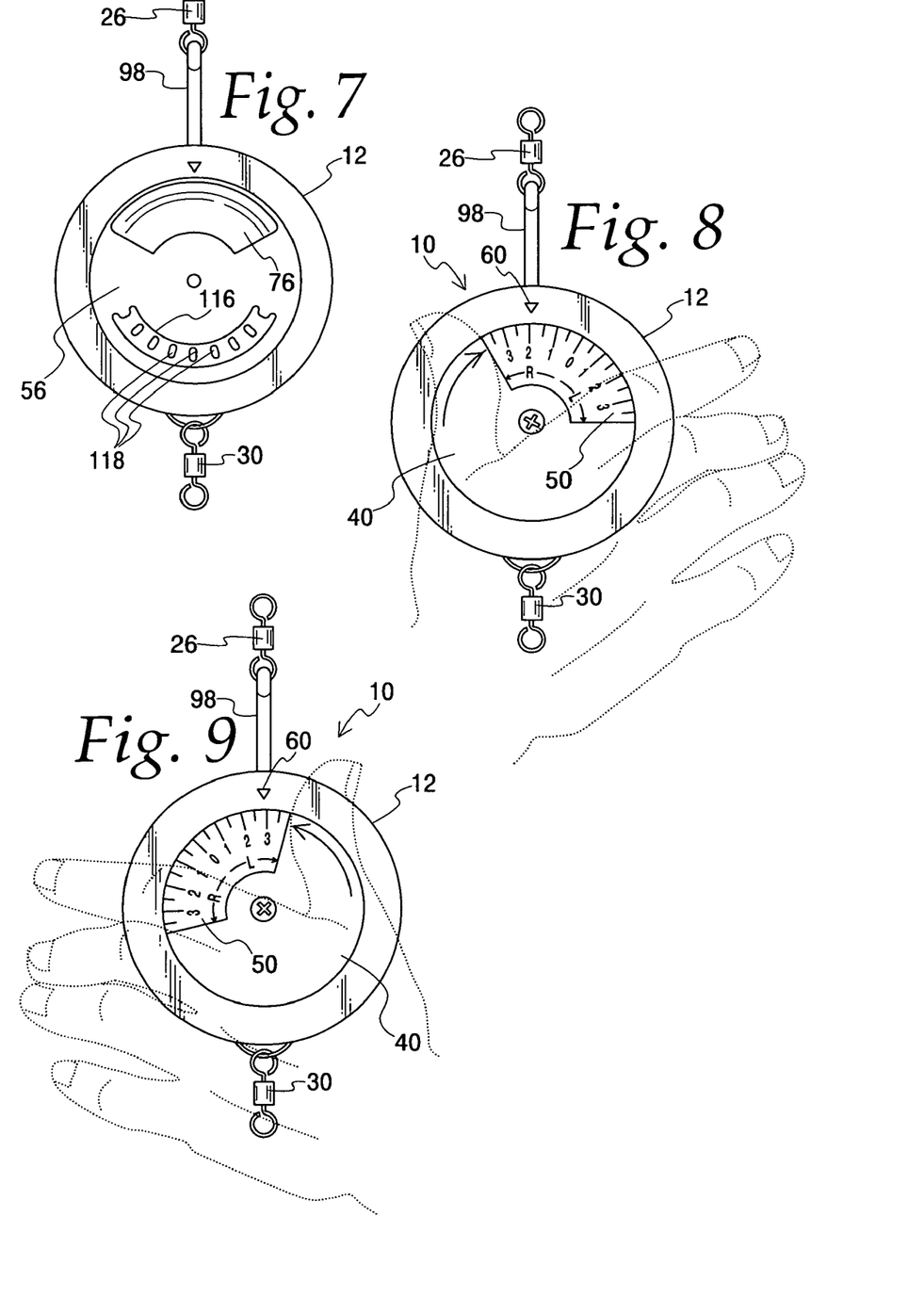
FIG. 7 is a schematic top plan view of a weight member placed on top of the plate portion thereof.
FIGS. 8 and 9 are schematic top plan views showing hand adjustment of the hydrodynamic fishing device in phantom.

Referring to FIGS. 8 and 9, the hydrodynamic fishing device 10 can be operated at a number of different settings so as to control the three-dimensional position or path of the hydrodynamic fishing device as it passes through the water. In FIG. 8, the plate positioning controller 40 is manually moved or indexed in a clockwise direction to provide increasing "rightward" adjustment (an opposite adjustment is shown in FIG. 9). The scale applied to ridge 50 provides graduated indications of adjustment and numerical indicia are provided to keep track of the amount of adjustment.

The current setting of the amount of adjustment is indicated by indicator arrow 60. For example, a setting of Magnitude 2 rightward adjustment is indicated in FIG. 8. This causes the concentrated weight of insert 76 (or alternatively, a solid ridge 50 of dense material) to be shifted away from the direction of forward and rearward lines 28, 32, thereby causing the plate 12 to list in a rightward direction, laterally displaced from the path of travel normally assumed with a neutral position setting of "0". The amount of lateral displacement of the path of travel of the hydrodynamic fishing device 10 increases as the magnitude of the adjustment setting increases. This also changes the depth of the path of travel of the hydrodynamic fishing device. With a neutral position of "0", the hydrodynamic fishing device 10 travels in a straight line toward the fisherman as it passes through the water. The hydrodynamic fishing device also travels at its greatest depth, with this setting. With increasing settings of right or left position control, the hydrodynamic fishing device travels at increasingly lesser depths, but with increasing lateral displacement, as the hydrodynamic fishing device is trolled or is reeled in toward the fisherman.

With a simple manipulation of the plate positioning controller, as indicated by the indexing illustrated in FIGS. 8, 9 and 10, changes in the vertical and horizontal or lateral path of travel of the hydrodynamic fishing device are programmed.

As will now be explained, these simple and easy positioning adjustments are accompanied by tactile and/or audible indications allowing a precise control of positioning adjustment without requiring tools or implements. Thus, with simple manipulation motions, manual force directly applied to the hydrodynamic fishing device can produce a predetermined, reliable, and accurate adjustment, despite the use of gloves or the effects of prolonged exposure to cold or inclement weather. Further, with the present invention, positioning adjustments are always made with familiar, constant friction between the control members.

Referring again to FIGS. 3 and 7, plate 12 has an inner face 56 provided with raised pad 116 against which the plate positioning controller 40 is pressed, preferably with a spring bias force. As mentioned, this bias force can be provided by a bias spring such as the spring 72, or, as will be explained herein, can be provided by deflection of the controller body portion 42 by tightening screw fastener 70 to the body of plate 12, (i.e., in the region where fin 80 and clamping member 88 overlap, as indicated for example in the cross-sectional view of FIG. 12). Referring to FIGS. 11a and 12, it can be seen that projection 114 and the face 110 of insert 76 are raised slightly above the inner face 46 of plate 12. Also, as can be best seen in FIGS. 11b and 12, raised pad 116 extends above the inner surface 56 of plate 12. It is generally preferred that the upper surface of raised pad 116 is approximately coplanar with the upper surface of raised rim 58, as indicated for example in the cross-sectional view of FIG. 12. As can be seen in FIGS. 3 and 11b, a series of apertures or depressions 118 are provided in the raised pad 116.

Thus, with plate 12 and plate positioning controller 40 being juxtaposed and joined together by screw fastener 70, the inner faces 46, 56 are brought close together, so that the sliding surface 110 of insert 76 can slide across face 56 as the plate positioning controller is rotated back and forth. As mentioned, in the preferred embodiment, insert 76 is formed of lead or similar material. The exposed face 10 of the lead insert is lubricious, providing a relatively low friction sliding contact with the inner face 56 of plate 12. Thus, the exposed face 110 acts as a sliding shoe of reduced friction material that supports the underside of plate positioning controller 40, allowing the plate positioning controller 40 to be readily displaced even small amounts with a controlled reliable result.

The protruding exposure of the sliding surface 110 of insert 76 cooperates with force applied by screw fastener 70 to apply a momentum force that urges projection 114 into engagement with raised pad 116, so as to pass from one depression 118 to another as the controller is indexed, providing a tactile and/or audible indication of the movement of projection 114 from one predetermined position to another, and hence the movement of the scale carried on ridge 50 from one indicated index position to another. If desired, depressions 118 could be formed in face 56, with raised pad 116 omitted. However, it is been found advantageous to locate the depressions in a raised pad, such as pad 116, so as to further augment the positive engagement with the projection 114. As will be appreciated, the extension of projection 114 and the sliding surface 110 of insert 76 beyond the inner face 46 of plate 12 causes the center of the flat plate-like controller body portion 42 of plate positioning controller 40 to be raised slightly above the inner face 56 of plate 12. With a suitable choice of material for plate positioning controller 40, such as a resilient plastic, the controller body portion 42 of the plate positioning controller 40 can be depressed, even close to, or at the point of contact with, the inner face 56 of plate 12, under application of force from screw fastener 70. This deflection of body controller portion 42 between projection 114 and the sliding surface 110 of insert 76 causes bending about line 55 (shown in FIG. 3) that stores a substantial bias force urging projection 114 into the depressions 118. Accordingly, if desired, the bias spring can, in these arrangements, be eliminated and/or replaced with a flat washer or a split lock washer, for example. However, if a still greater bias forces desired, a spring such as the bias spring 72 or a wave washer or coil spring or other bias member can be associated with screw fastener 70, to urge plate positioning controller 40 toward plate 12 with an increased bias force. If desired, the relative positions of projection 114 and the apertures or depressions 118 can be reversed, that is, interchanged one for the other.

The foregoing description and the accompanying drawings are illustrative of the present invention. Still other variations and arrangements of parts are possible without departing from the spirit and scope of this invention.

I claim:

1. A hydrodynamic fishing device, comprising:
   a plate for developing vertical pressure with changes in attitude of the plate, as the plate passes through a body of water;
   a plate positioning controller;
   a first connection on the plate to which a hook may be connected; and
   a second connection on the plate to which a trolling line may be connected, the second connection being pivotally connected to the plate so as to be pivotable in a plane which is normal to the plate;
   the plate positioning controller provided with an upstanding weighting ridge, pivotally mounted to the plate about an axis substantially normal to the plate, manually indexable relative to the plate and biased against the plate;
   interengaging detent members on said plate and said plate positioning controller for controlling movement of the plate positioning controller with respect to the plate in a series of separate adjustment positions,
   whereby, with direct application of manual force, the plate positioning controller is moved and indexed relative to the plate to a plurality of predetermined adjustment positions that establish different paths of travel of the plate as the plate passes through a body of water.

2. The device of claim 1 wherein the plate positioning controller has a flat face opposed to the plate, with the plate as well as the flat face having circular configurations.

3. The device of claim 2 wherein the flat face is generally concentrically mounted to the plate.

4. The device of claim 1 wherein the weighting ridge is curved.

5. The device of claim 1 wherein the weighting ridge is part cylindrical in shape.

6. The device of claim 1 wherein indexing of the plate positioning controller with respect to the plate provides a tactile indication of a change in adjustment position.

7. The device of claim 1 wherein indexing of the plate positioning controller with respect to the plate provides tactile and audible indication of a change in adjustment position.

8. The device of claim 1 wherein the weighting ridge on the plate positioning controller is curved and is upstanding from a flat face of said controller, the weighting ridge having a downstream facing concave inner face and an opposed upstream facing convex outer face adjacent the second connection.

* * * * *